LE ROY PATERY.
AUTOMOBILE GOGGLES.
APPLICATION FILED NOV. 23, 1916.
1,240,594.
Patented Sept. 18, 1917.
2 SHEETS—SHEET 1.
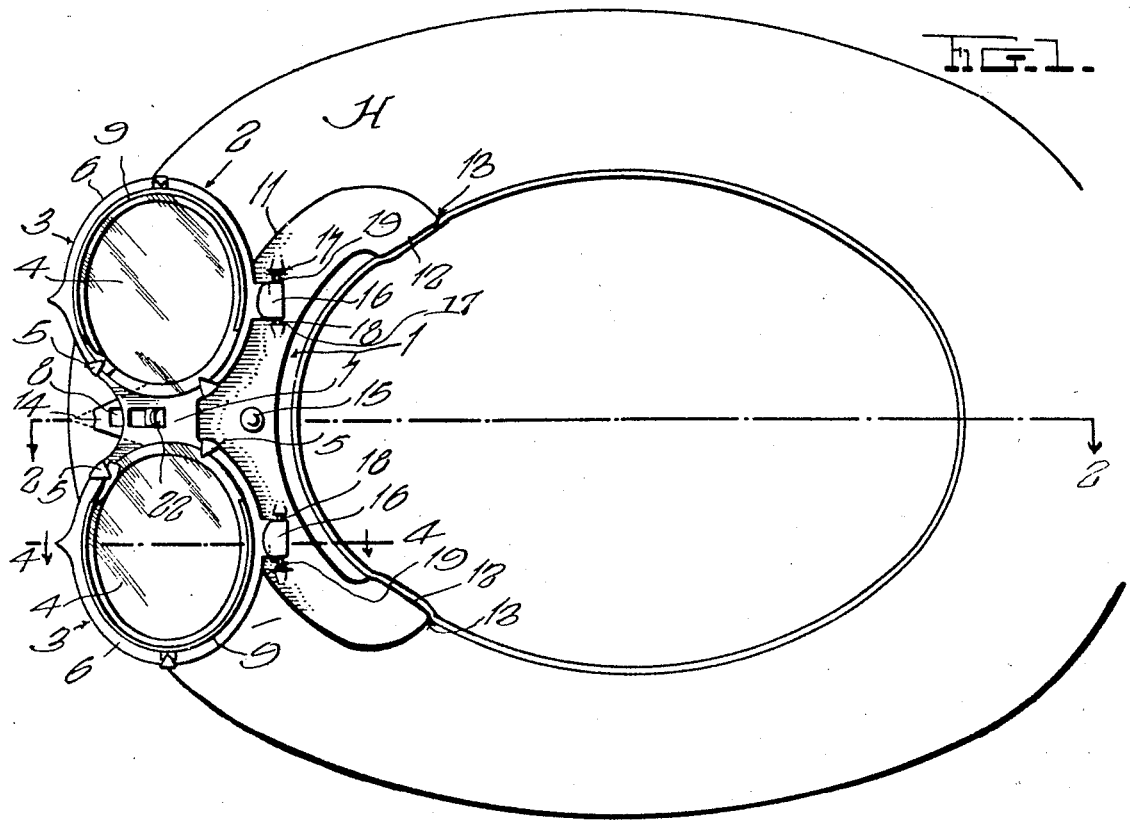
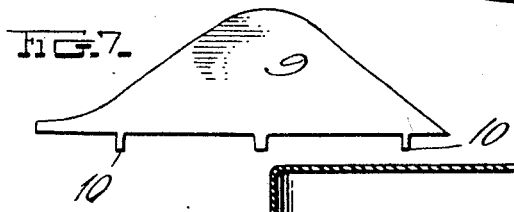
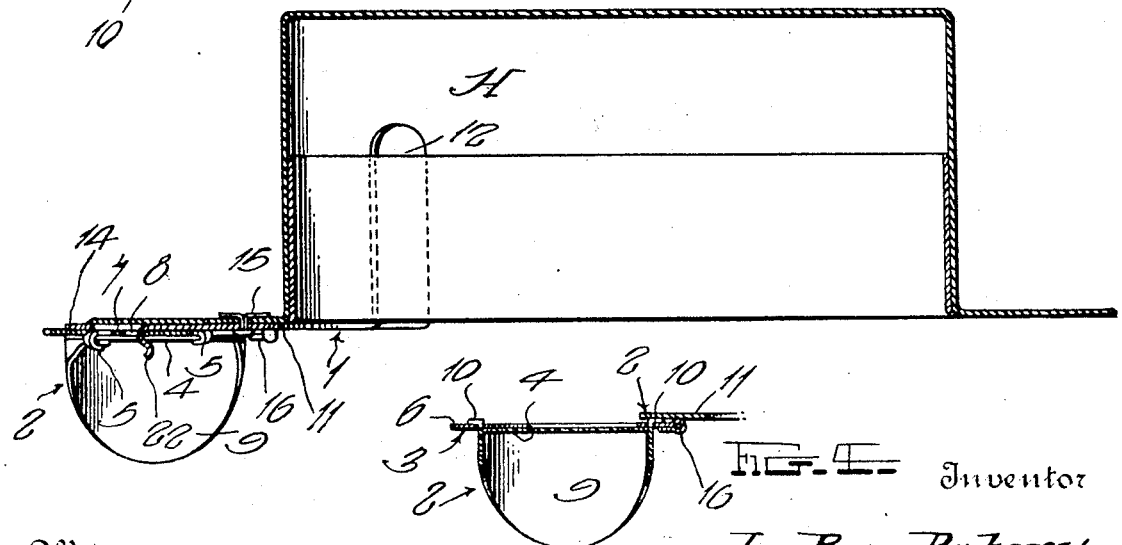
Witness
H. Woodard
Inventor
Le Roy Patery
By H. Q. Willson & Co
Attorneys

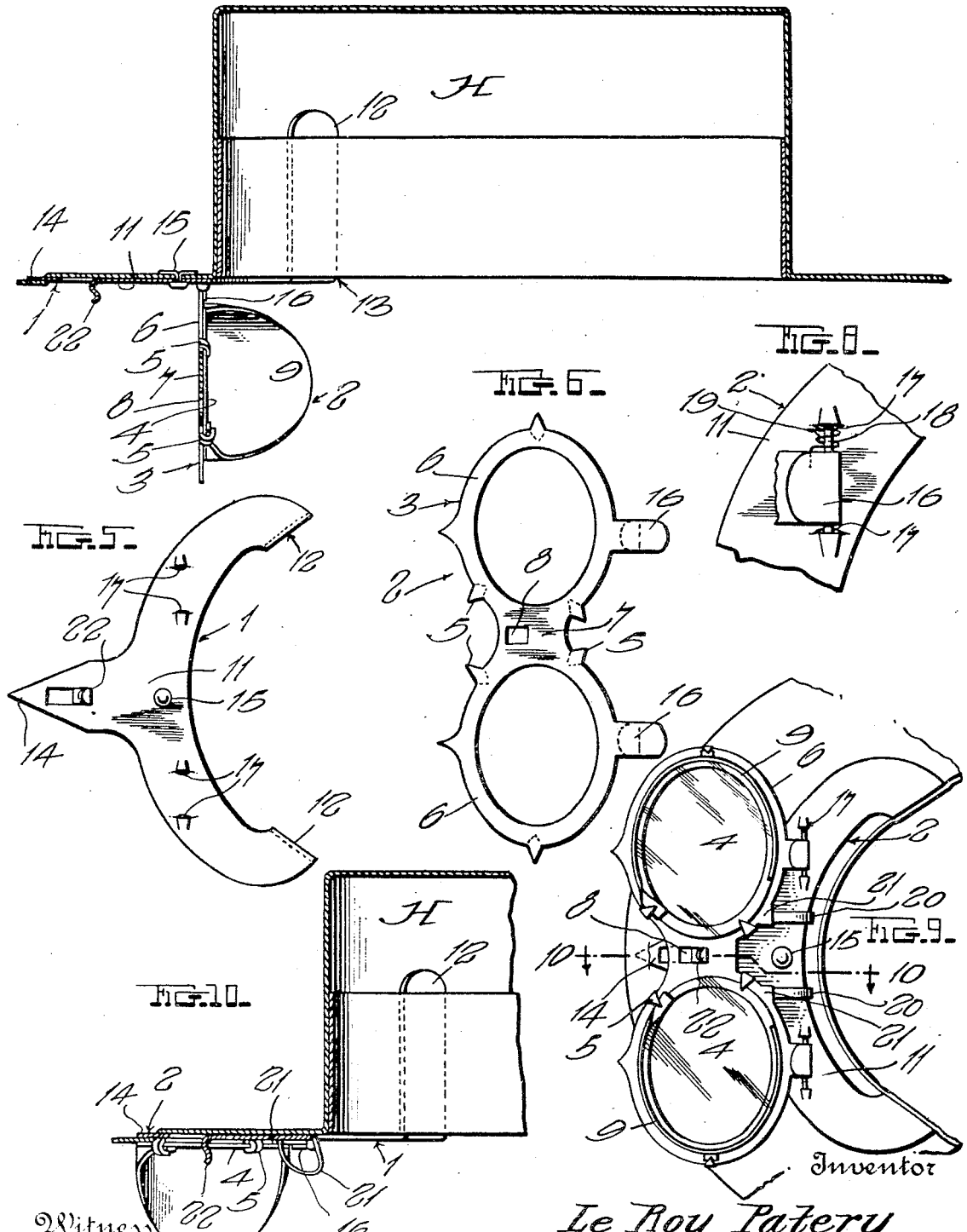

UNITED STATES PATENT OFFICE.

LE ROY PATERY, OF PORTLAND, OREGON.

AUTOMOBILE-GOGGLES.

1,240,594.  Specification of Letters Patent.  Patented Sept. 18, 1917.

Application filed November 23, 1916. Serial No. 133,025.

*To all whom it may concern:*

Be it known that I, LE ROY PATERY, a citizen of the United States, residing at Portland, in the county of Multnomah and State of Oregon, have invented certain new and useful Improvements in Automobile-Goggles; and I do declare the following to be a full, clear, and exact description of the invention, such as will enable others skilled in the art to which it appertains to make and use the same.

This invention relates to improvements in eye glasses, more particularly to goggles for use by automobilists and the like.

The primary object of the invention is to provide a device of this character which can be quickly and easily attached to any hat, either soft or stiff, or cap, the device being supported thereby.

An additional object is to provide an attachment whereby the eye glass portion of the device may be held either in a horizontal or vertical position.

With these and many other objects in view the invention resides in the novel features of construction, combination and arrangement of parts which will be hereinafter more particularly described and claimed and shown in the drawings wherein:

Figure 1 is a plan view of the under side of a hat showing my automobile goggles applied thereto;

Fig. 2 is a vertical section on the plane of the line 2—2 of Fig. 1;

Fig. 3 is a similar view showing the eye glasses of the attachment arranged in a different position.

Fig. 4 is a detail transverse section on the line 4—4 of Fig. 1;

Fig. 5 is a bottom plan view of the eye glass holder;

Fig. 6 is a similar view of the blank forming the frame of the eye glasses;

Fig. 7 is a plan view of the blank from which one of the guards is formed;

Fig. 8 is a fragmentary view showing more particularly the means of attaching the eye glasses to the holder, and also for holding the former against flapping back and forth when in their operative position;

Fig. 9 is a view similar to Fig. 1 showing another method for holding the eye glasses against flapping; and, Fig. 10 is a vertical transverse section on the line 10—10 of Fig. 9.

Referring more particularly to the drawings it will be seen that the device consists of two main parts, the eye glasses proper, and the holder for mounting the same upon a hat or cap, the latter part being designated by the numeral 1 and the first by 2. The hat upon which the invention is shown applied in the several figures of the drawing is denoted by the reference character H. The eye glasses proper comprise a frame 3 stamped from a single piece of material such as thin sheet metal, or molded from celluloid or the like, the lenses 4 of glass, mica or celluloid, being held to the rear face of the frame 3 by means of fingers 5 which are formed on the peripheries of the eye pieces 6 of the frame and bent inwardly into engagement with said lenses. The nose piece 7 which connects the parts 6 of the frame 3 has a preferably rectangular opening 8 formed therein for a purpose which will later appear.

If desired wind shields or guards 9 may be secured to the outer portions of the eye pieces 6 as shown in the drawings. These guards are formed from material similar to the frame 3 and are secured thereto by means of the fingers 5 and lugs 10, the latter being formed on the edge of the guards as seen in Fig. 7. At predetermined points on the frame 3 openings are formed to receive these lugs 10, and when they have been inserted therethrough they are bent laterally as will appear in Fig. 4, thus retaining the guards in position.

The holder 1 is in the form of an attaching plate 11, the blank from which it is formed being substantially U-shaped, and of a material similar to that from which the other parts of the device are constructed. The intermediate portions of this attaching plate are adapted to lie substantially horizontal and engage the under side of the brim of a hat or the vizor of a cap as shown in Figs. 1 and 2, the arms 12, however, being bent substantially upright and disposed in the inside of the hat or cap. The upright arms 12 are preferably passed through slits 13 formed in the sweat band of the hat, thus holding the outer parts of the attaching plate against shifting.

The central parts of the plate 11 are held to the hat both by means of a spur 14 which projects from the front edge thereof and a suitable fastener 15. The spur is designed to grip the fabric of the hat or cap, whereas the prongs of the fastener 15 extend through an aperture in the plate 11 and through the material composing the brim or vizor of the head-piece. After these parts have been engaged with the hat, the holder will be securely held in proper position thereon so that the eye glasses 1 which are hingedly connected thereto will depend in front of the eyes of the person wearing the hat.

As hereinbefore mentioned the eye glasses are pivoted to the plate 11, the means provided for this purpose preferably consisting of ears 16, one of which extends from the top of each eye piece 6. These ears are designed to rest in seats formed between slits 17 in the plate 11, the ears being pivotally connected to the plate by means of pivot pins 18 which extend through the former and lie in the seats of the latter. In view of this type of connection it is necessary to provide a means for holding the eye glasses in lowered or operative position so that they will not flap back and forth to the annoyance of the user. This may be accomplished by coiled springs 19 which surround the pivot pins 18, their opposite ends engaging with the plate 11 and ears 16. Thus the glasses will be continuously pushed against the face of the wearer when the same are in their lowered position.

Another method for accomplishing the same purpose is shown in Figs. 9 and 10. This consists of a pair or more of springs 20 formed from tongues which project from one edge of the plate 11 and lips 21 formed on the frame 3. These lips continuously engage the springs 20 so that the springs act to continuously push the eyeglasses toward the face of the wearer. Except for this modified holding means, the device shown in Figs. 9 and 10 is similar to that illustrated in the other figures.

When it is desired to dispose the eye glasses in such a position that they do not cover the wearer's eyes, they are swung upwardly to the position shown in Figs. 1 and 2. They are held in this raised position by means of a leaf spring 22 which engages one edge of the opening 8 in the nose piece 7 of the frame. This spring is formed from a tongue struck from the material of which the plate 11 is constructed. This spring effectively holds the glasses in this horizontal position against the tension of the springs 19 or 20 until it is manually released, whereupon they will move the parts down into the position shown in Fig. 3.

With such a device as this the motorist will be effectively protected at all times inasmuch as he will be able at a moment's notice to drop the eye glasses in front of his eyes in case he is not already using them in this position. By providing lenses 4 of different color such as amber or other dark shades, the driver's eyes will be protected from glaring headlights or bright sunlight. Plain glasses may be used to protect the eyes from the dust or wind.

I claim:

1. The combination with a hat, of an eye glass holder comprising an attaching plate, upright arms extending therefrom and engaged with the inside of the hat to secure said plate thereto, a pair of glasses hinged to said plate, and means for holding said glasses in horizontal or vertical position.

2. The combination with a hat, of an eye glass holder comprising a U-shaped attaching plate, the arms of said plate extending upwardly therefrom and engaged with the inside of the hat to secure said plate thereto, a pair of glasses hinged to said plate, and means for holding said glasses in horizontal or vertical position.

3. The combination with a hat, of an eye glass holder comprising a U-shaped attaching plate, and a spur projecting from the front edge of said plate, and adapted to engage the fabric of said hat, said attaching plate being disposed in horizontal position, the outer ends of the arms of said U-shaped plate being bent upwardly and engaged with the inside of a hat, a pair of glasses hinged to said plate, and means for holding said glasses in horizontal or vertical position.

4. The combination with a hat, of an eye glass holder comprising a U-shaped attaching plate disposed in horizontal position in engagement with the under side of said hat, the arms of said U shaped plate being extended upwardly and engaged with the inside of the hat, a spur projecting from the intermediate portion of said plate and engaged with the fabric of the hat, a pronged fastener extending through said plate and said hat to secure the former thereto, a pair of glasses hinged to said plate, and means for holding said glasses in horizontal or vertical position.

5. In a device of the class described, an eye glass holder comprising a substantially U-shaped plate adapted to be disposed horizontally and in engagement with a hat, the arms of said plate being bent upright to be disposed inside of a hat, a pair of eye glasses pivoted to said plate, and means for holding said glasses in vertical or horizontal position.

6. In a device of the class described, an eye glass holder comprising a substantially U-shaped plate, the arms of said plate being bent upright, a pair of eye glasses pivoted to said plate, said eye glasses having an opening formed therein, and a tongue struck from said plate and bent to form a spring, said spring being adapted to engage said opening and hold said glasses in horizontal position.

In testimony whereof I have hereunto set my hand in the presence of two subscribing witnesses.

LE ROY PATERY.

Witnesses:
B. D. GIBSON,
L. D. GIBSON.